(12) United States Patent
Liu et al.

(10) Patent No.: US 11,832,621 B1
(45) Date of Patent: Dec. 5, 2023

(54) METHODS AND SYSTEMS FOR INTELLIGENT PROCESSING OF AQUATIC PRODUCTS

(71) Applicant: OCEAN RESEARCH CENTER OF ZHOUSHAN, ZHEJIANG UNIVERSITY, Zhejiang (CN)

(72) Inventors: Shuo Liu, Zhoushan (CN); Yong Cai, Zhoushan (CN); Shanmin Zhou, Zhoushan (CN); Zhiyong Sun, Zhoushan (CN); Kaiyou Jiang, Zhoushan (CN); Wanglin Lin, Zhoushan (CN); Jiajie Ma, Zhoushan (CN); Yu Zhang, Zhoushan (CN); Jingyang Li, Zhoushan (CN); Kewei Gu, Zhoushan (CN); Zhijian Yang, Zhoushan (CN); Fan Ding, Zhoushan (CN)

(73) Assignee: OCEAN RESEARCH CENTER OF ZHOUSHAN, ZHEJIANG UNIVERSITY, Daishan Zhoushan (CN)

( * ) Notice: Subject to any disclaimer, the term of this patent is extended or adjusted under 35 U.S.C. 154(b) by 0 days.

(21) Appl. No.: 18/355,404

(22) Filed: Jul. 19, 2023

Related U.S. Application Data

(63) Continuation of application No. 17/932,289, filed on Sep. 14, 2022, now Pat. No. 11,751,578.

(30) Foreign Application Priority Data

Dec. 31, 2021 (CN) .......................... 202111658818.9
Jan. 24, 2022 (CN) .......................... 202210077959.X

(51) Int. Cl.
*A22C 17/00* (2006.01)
*A22C 29/00* (2006.01)

(52) U.S. Cl.
CPC .......... *A22C 17/0086* (2013.01); *A22C 29/00* (2013.01)

(58) Field of Classification Search
CPC .......................... A22C 17/0086; A22C 29/00
(Continued)

(56) References Cited

U.S. PATENT DOCUMENTS 2,822,274 A * 2/1958 Williams ................ A23L 17/50
452/18
3,947,921 A * 4/1976 Berk .................... A22C 25/003
452/108
(Continued)

FOREIGN PATENT DOCUMENTS

CN          103268609 A      8/2013
CN          103778429 A      5/2014
(Continued)

OTHER PUBLICATIONS

First Office Action in Chinese Application No. 202210077959.X dated Jan. 11, 2023, 12 pages.
(Continued)

*Primary Examiner* — Richard T Price, Jr.
(74) *Attorney, Agent, or Firm* — METIS IP LLC

(57) ABSTRACT

The present disclosure involves a calculation method and device for intelligent cutting squid white slices, the calculation method being implemented on the device for intelligent cutting squid white slices. The calculation method may be implemented on a calculation device, the calculation device may have at least one processor and at least one storage medium including an instruction set used for intelligent cutting the squid white slices, the calculation method including: reading a laser point cloud data of a three-dimensional (3D) topography of the squid white slices; optimizing the laser point cloud data; extracting an effective
(Continued)

area of the squid white slices; determining a cutting zero point; determining a cutting process area; and determining optimization of a cutting point position and a cutting angle. The one or more embodiments provided by the present disclosure may satisfy the needs of large-scale continuous production in factories, reduce labor costs, and improve production efficiency.

9 Claims, 15 Drawing Sheets

(58) Field of Classification Search
USPC .......................................................... 452/12
See application file for complete search history.

(56) References Cited

U.S. PATENT DOCUMENTS

| | | | |
|---|---|---|---|
| 4,446,601 A * | 5/1984 | Carruthers | A22C 25/145 |
| | | | 452/173 |
| 5,779,530 A | 7/1998 | Agote | |
| 6,468,142 B1 * | 10/2002 | Deyerle | A22C 25/003 |
| | | | 452/18 |
| 9,510,603 B2 * | 12/2016 | Cross | A22C 25/185 |

FOREIGN PATENT DOCUMENTS

| | | |
|---|---|---|
| CN | 105494588 A | 4/2016 |
| CN | 107047718 A | 8/2017 |
| CN | 110148144 A | 8/2019 |
| CN | 209846093 U | 12/2019 |
| CN | 113551615 A | 10/2021 |
| CN | 214394307 U | 10/2021 |
| CN | 215270326 U | 12/2021 |
| WO | 2021109988 A1 | 6/2021 |
| WO | 2021151319 A1 | 8/2021 |

OTHER PUBLICATIONS

Xu, Zhipeng et al., Research on Squid Scanning System and Segmentation Algorithm Based on Line Laser, Journal of China University or Metrology, 31(1): 92-96, 2020.
First Office Action in Chinese Application No. 202111658818.9 dated Jan. 18, 2023, 20 pages.
Decision to Grant a Patent in Chinese Application No. 202111658818.9 dated Mar. 9, 2023, 4 pages.

* cited by examiner

METHODS AND SYSTEMS FOR INTELLIGENT PROCESSING OF AQUATIC PRODUCTS

CROSS-REFERENCE TO RELATED APPLICATION

This application is a continuation of U.S. application Ser. No. 17/932,289, filed on Sep. 14, 2022, which claims priority of Chinese Patent Application No. 202111658818.9, filed on Dec. 31, 2021, and Chinese Patent Application No. 202210077959.X, filed on Jan. 24, 2022, the contents of which are entirely incorporated herein by reference.

TECHNICAL FIELD

The present disclosure involves the field of aquatic product processing, and in particular, a method and systems for intelligent processing of aquatic products.

BACKGROUND

Aquatic product processing and utilization may be the continuation of marine fishery production activities, which is a key means of generating greater economic value in the context of current limited fisheries resources. Due to the large variety of processing types of aquatic processing enterprises and irregular raw materials, it may be difficult to achieve automatic and intelligent processing. Therefore, the intelligent production and processing technology in the field of aquatic processing has been rarely studied. Up to now, domestic aquatic product processing may still be dominated by manual labor, and the proportion of automated and intelligent processing device may be quite low. For example, ocean squid may be one of the main raw materials for aquatic processing and cutting squid white slices may be an important part of the deep processing of aquatic products. In the past, it relied on a large number of skilled workers to cut manually. The production efficiency may be low and there may be many defective products.

With the advancement of the times, intelligence brings industrial production to a new level. Nowadays, artificial intelligence has become a new field that leads people to explore and discover new fields, and it may be likely to bring new changes to the entire society.

Intelligent manufacturing technology may further be applied to the aquatic processing industry. The replacement of manually engaging in thawing, slicing, blocking, automatic cooking, and sorting and packaging through intelligent manufacturing device may not only greatly reduce labor costs, but also greatly improve product quality, reduce process losses, and improve the utilization rate of limited aquatic resources.

SUMMARY

One or more embodiments of the present disclosure provide a calculation method for intelligent cutting squid white slices, including the following operations: reading a laser point cloud data of a three-dimensional (3D) topography of the squid white slices; optimizing the laser point cloud data; extracting an effective area of the squid white slices; determining a cutting zero point; determining a cutting process area; and determining optimization of a cutting point position and a cutting angle.

In some embodiments, the determining optimization of a cutting point position and a cutting angle includes (a) setting a cutting point position of a first cut at an edge of the cutting process area, and setting a cutting angle as a at the same time; (b) traversing backward at the cutting angle $\alpha$ to find a cutting point position d1 of a second cut according to quality requirements of squid block products, calculating an intersection p1 of the second cut and an upper surface, and calculating a reference value L of a diagonal length of a cut squid block; (c) when calculating a cutting point position of a third cut, first obtaining a cutting position p2 from an upper surface of the squid and a cutting point position d2 from a lower surface of the squid according to the reference value L of the diagonal length; then determining whether a slice volume between a current cutting position and a previous cutting position satisfies a quality requirement; in response to a determination that the slice volume between the current cutting position and the previous cutting position satisfies the quality requirement, performing cutting directly; in response to a determination that the slice volume between the current cutting position and the previous cutting position does not satisfy the quality requirement, adjusting the cutting angle $\alpha$; after several adjustments, the quality requirement may still be unsatisfied, restoring the cutting angle to $\alpha$, and translating the cutting position according to a quality difference; (d) calculating a cutting point position and a cutting angle of a rest cutting process area according to a same method as calculating the cutting point position and the cutting angle of the third cut; and (e) sending a calculated optimal solution of the cutting point position and the cutting angle of the squid white slices to a control system for cutting until an end of the process.

In some embodiments, the specific process of optimizing the laser point cloud data may be: first suppressing noise of the laser point cloud data through a filtering algorithm, then performing a right-angle edge optimization according to a sensor viewing angle projection and combining an edge feature of the squid white slices to restore actual data of edges of the squid white slices.

In some embodiments, the filter algorithm adopts a median filter, and a filter window may be 9*5.

In some embodiments, the extracting an effective area of the squid white slices includes obtaining row and column coordinates where edges of the squid white slices locates through traversing row and column vectors, and cropping the laser point cloud data with the row and column coordinates to reduce a scale of a matrix and remove a large amount of invalid row and column data.

In some embodiments, the determining a cutting zero point may specifically include: taking a forefront of detected squid white slices as a zero point coordinate, which is taken as a common zero point coordinate of the intelligent device for cutting the squid white slices and an image processing system.

In some embodiments, the common zero point coordinate may be a horizontal starting point position of a point cloud image of the squid, the horizontal starting point position may be obtained on the intelligent device for cutting the squid white slices through an opposed sensor detecting; the intelligent device for cutting the squid white slices may take the coordinate as the zero point to push a head of the squid white slices to a cutting position for cutting.

In some embodiments, the determining a cutting process area may specifically include: finding the cutting process area based on an edge missing rate boundary condition of a qualified squid block product.

One or more embodiments of the present disclosure provide an intelligent system for cutting the squid white slices, including: a point cloud data reading module configured to read laser point cloud data of a 3D topography of the squid white slices; a data optimizing module configured to optimize the laser point cloud data; an area extraction module configured to extract an effective area of the squid white slices; a zero point determination module configured to determine a cutting zero point; an area determination module configured to determine a cutting process area; and, a cutting adjustment module configured to determine optimization of a cutting point position and a cutting angle.

One or more embodiments of the present disclosure provides a calculation device for intelligent cutting the squid white slices, including: a memory, a processor, and a computer program stored in the memory, when executed on the processor, the processor may perform the above calculation method for intelligent cutting the squid white slices.

One or more embodiments of the present disclosure provides a non-transitory computer-readable storage medium that stores a computer program, the computer program may be used to perform the above calculation method for intelligent cutting the squid white slices.

One or more embodiments of the present disclosure provide an intelligent device for cutting the squid white slices. The device includes a feeding device, a fixed pushing device, a scanning device, a cutting rotating device, and a controlling system.

In some embodiments, the feeding device includes a side pushing cylinder slide, a forward pushing cylinder slide, a material box, and a pushing board; the side pushing cylinder slide may be located below the material box, the material box may be arranged on the side of the forward pushing cylinder slide and above the side pushing cylinder slide, the pushing board may be fixed with the forward pushing cylinder slide; the side pushing cylinder slide may be configured to push the squid white slices out of the material box and onto a conveyor board, the forward pushing cylinder slide drives the pushing board to push the squid white slices to a flattening position.

In some embodiments, the fixed pushing device includes two long slides, a pushing cylinder, a needle fixed structure, and a connection structure; the long slides may be located on both sides of the conveyor board, the pushing cylinder may be fixed above the slide of the long slides, the needle fixed structure may be located above the conveyor board, which is connected with the pushing cylinder through the connection structure; when the pushing cylinder is downward, the needle fixed structure may be driven down, and the needle fixed structure may be pierced into the squid to fix the squid; at the same time, the slide drives the pushing cylinder and the needle fixed structure to move forward together, so as to achieve movement of the squid on the conveyor board.

In some embodiments, the scanning device consists of a 3D scanner, a scanner holder, and a processing system; the scanner holder spans both sides of the conveyor board, the 3D scanner may be fixed at a central position of a top of the scanner holder, and scanning and imaging of the squid may be completed during a pushing process of the fixed pushing device.

In some embodiments, the cutting rotating device consists of a cutting rotating device holder, a rotating arm, a cross slide fixed holder, two straight line slides, four servo motors, a reducer, a blade, and a blade fixed holder; the cutting rotating device holder spans both sides of a cutting platform and may be fixed on a base; the rotating arm may be installed on two inner sides of the cutting rotating device holder, which rotates around an axis through a bearing; the cross slide fixed holder may be installed between the two rotating arms, which connects and fixes the two rotating arms; other side of the bearing may be installed with two reducers with the servo motors, which are fixed with the rotating arm using a connection shaft, rotation of the servo motors drives the rotating arm to rotate; the two straight line slides may be installed in a cross, one of which is installed on the slide of the other straight line slide, and the two straight line slides may be installed on the cross slide fixed holder as a whole to achieve horizontal and vertical motion of the slide; and the blade may be fixed on the slide of the below straight line slide through the blade holder, which is used to achieve horizontal and vertical cutting motion with the slide.

In some embodiments, after the pushing device finishes pushing for a distance calculated by the control system, a clamping device presses the squid tightly, and a vertical motor drives a lead screw slide to move downward, the blade moves downward with the slide, at the same time, the horizontal motor drives the lead screw slide and the blade to move horizontally. when the blade reaches a bottom end, the blade returns to an origin after a last horizontal movement; after the horizontal slide reaches the origin, the vertical slide drives the blade upward until the blade returns to an upper limit; and when the vertical slide moves upward, the horizontal slide keeps static.

The methods described in some embodiments of the present disclosure may satisfy the needs of large-scale continuous production in factories, reduce labor costs, and improve production efficiency.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following may have further illustration combined with the drawings.

Figure 1:
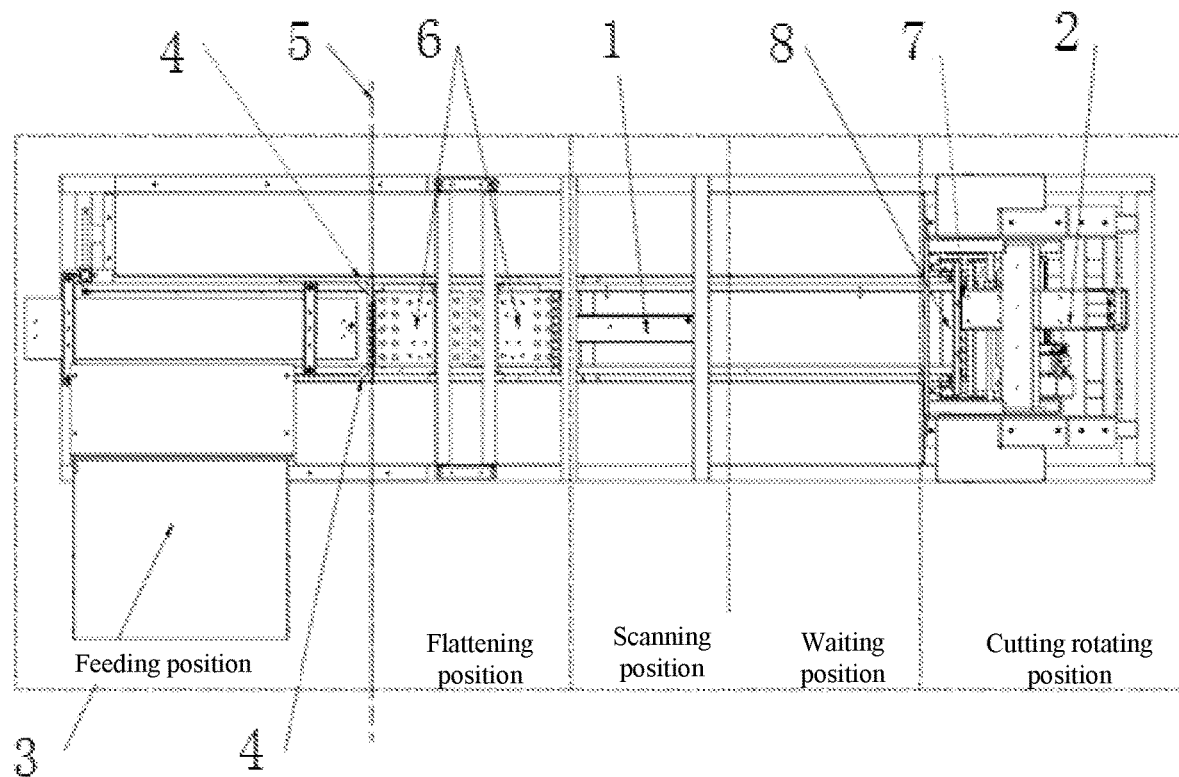
FIG. 1 is a position layout diagram of an intelligent device for cutting squid white slices according to some embodiments of the present disclosure.

As shown in FIG. 1, in some embodiments, the intelligent device for cutting squid white slices mainly include a feeding device 3, a flattening device 6, a material stop device 5, a scanning device 1, a fixed pushing device 4, a clamping device 7, a discharging device 8, a cutting rotating device 2, and a control system.

Figure 3:
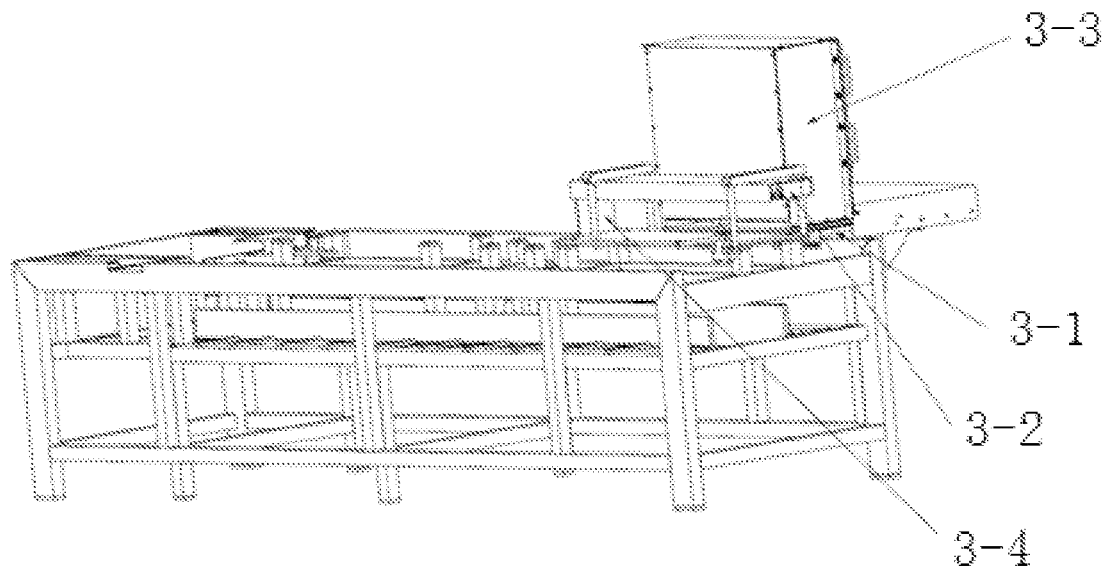
FIG. 3 is a schematic diagram illustrating a feeding device of the intelligent device for cutting squid white slices according to some embodiments of the present disclosure.

As shown in FIG. 3, the feeding device includes a side pushing cylinder slide 3-1, a forward pushing cylinder slide 3-2, a material box 3-3, and a pushing board 3-4. The side pushing cylinder slide is located below the material box, the material box may be installed on a side of a forward pushing cylinder and above the side pushing cylinder slide, and the pushing board may be fixed with the forward pushing cylinder slide. The feeding device executes operations: the side pushing cylinder slide may push squid white slices out of the material box and onto a conveyor board, the forward pushing cylinder slide drives the push board to push the squid white slices to a flattening position.

Figure 5:
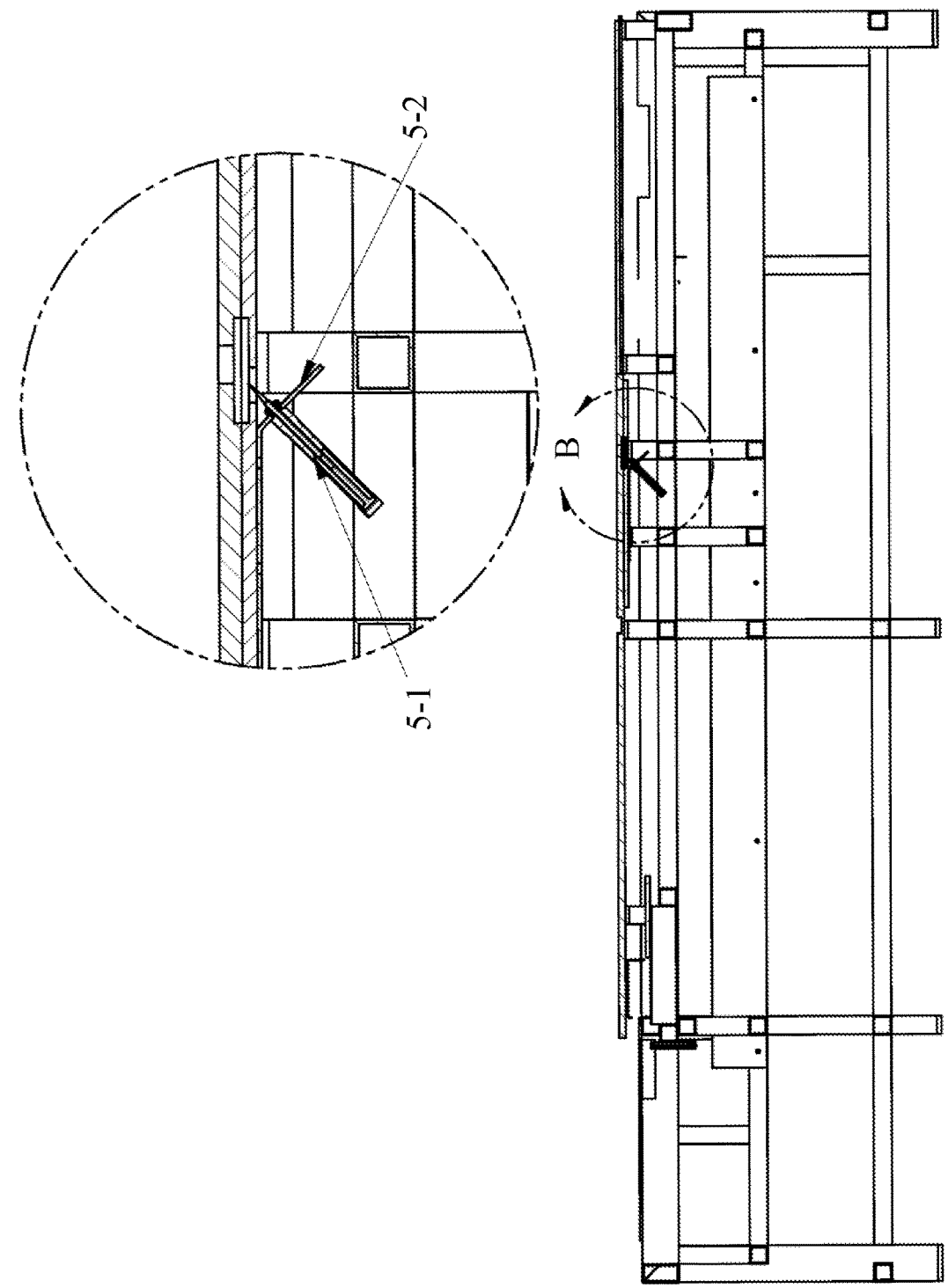
FIG. 5 is a schematic diagram illustrating a material stop device of the intelligent device for cutting squid white slices according to some embodiments of the present disclosure.

As shown in FIG. 5, the material stop device may be composed of a material stop cylinder 5-1 and a fixing plate 5-2. The material stop cylinder may be fixed under the conveyor board through the fixing plate, and a small opening may be provided on the conveyor board to just allow a cylinder bar of the material stop cylinder to pass through. A head of the cylinder bar of the material stop cylinder may be a sharp needle, which is convenient to pierce into the squid white slices to stop the squid white slices instantly. The material stop cylinder executes operations: when the forward pushing cylinder moves to a material stop line 5, the cylinder bar of the material stop cylinder stretches out, and the head of the cylinder bar may pierce into the squid white slices to stop the squid white slices instantly; and the cylinder retracts after the forward pushing cylinder retracts.

Figure 6:
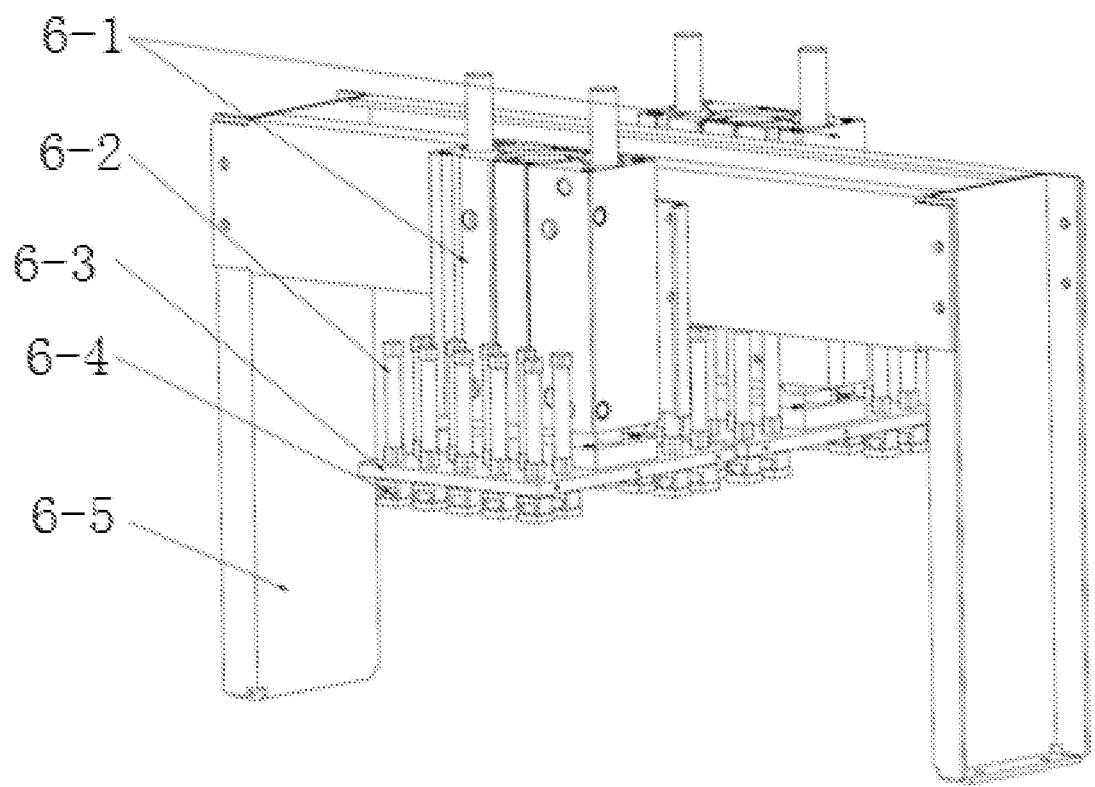
FIG. 6 is a schematic diagram illustrating a flattening device of the intelligent device for cutting squid white slices according to some embodiments of the present disclosure.

As shown in FIG. 6, the flattening device may be mainly composed of two flattening cylinders 6-1, a plurality of thumb cylinders 6-2, a flattening block 6-3, a flattening plate 6-4, and a fixing support 6-5. The fixed support spans the conveyor board and may be fixed on both sides of the base. The two flattening cylinders may be fixed on both sides of the fixing support. The cylinder bar may be fixed with the flattening plate. A plurality of fixing holes may be provided on the flattening plate, the thumb cylinder may be fixed in the fixing holes, the cylinder bar of the thumb cylinder passes through the flattening plate and may be fixed with the flattening block. The method of using the plurality of thumb cylinders may make the force evenly act on each point of the squid surface, so that the bottom surface of the squid may tightly fit the conveyor surface with no empty cavity. Meanwhile, the protrusions on the upper surface may further concave under the action of the flattening block to make the upper surface flat.

The flattening device executes operations: when the squid enters the flattening position, the flattening device starts. The cylinder bar of the flattening cylinder stretches out to drive the flattening plate and the thumb cylinder to move down. When the flattening cylinder reaches the bottom, the cylinder bar of the thumb cylinder stretches out to press the flattening block on the surface of the squid. After the flattening, the flattening cylinder and the thumb cylinder retract at the same time.

Figure 4:
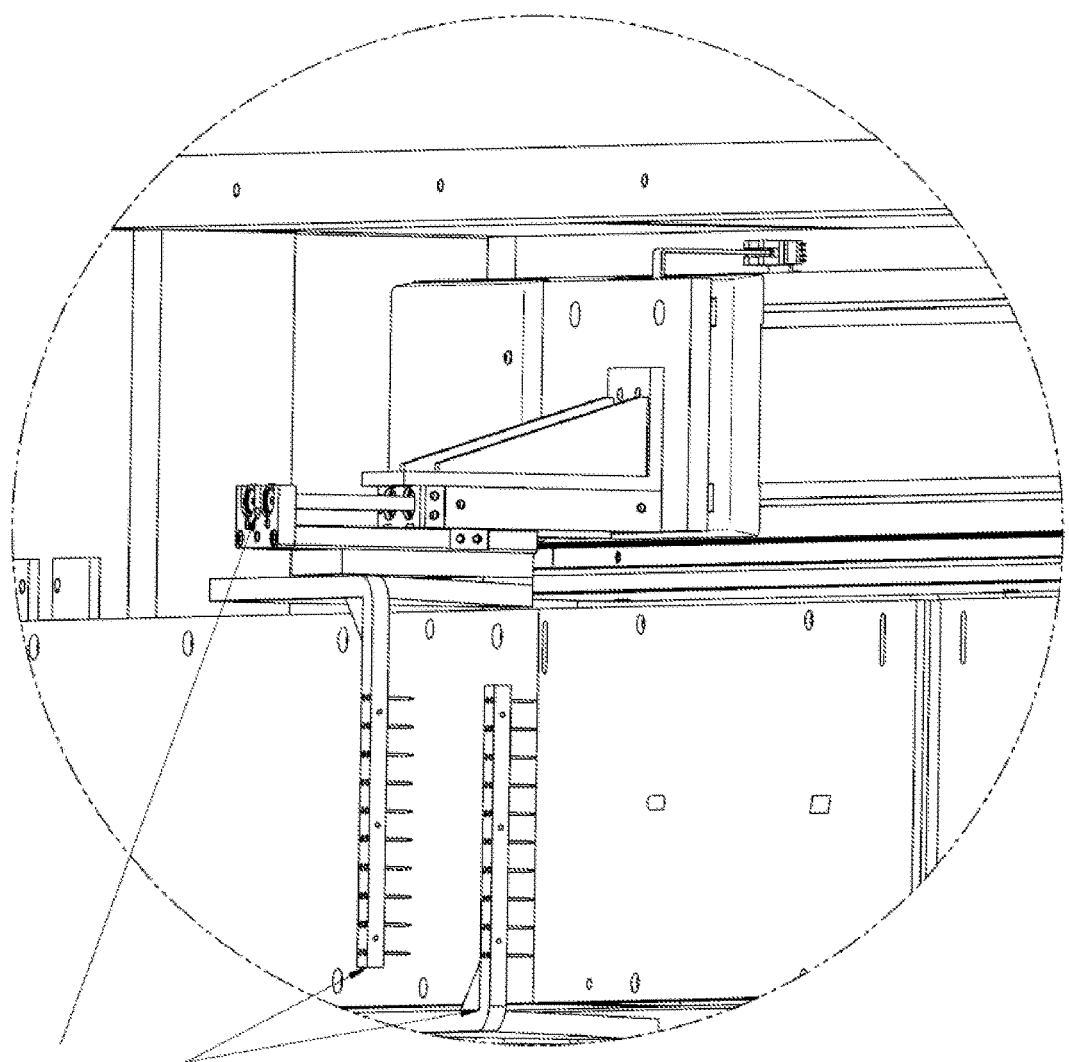
FIG. 4 is a schematic diagram illustrating a fixed pushing device of the intelligent device for cutting squid white slices according to some embodiments of the present disclosure.
Figure 4:
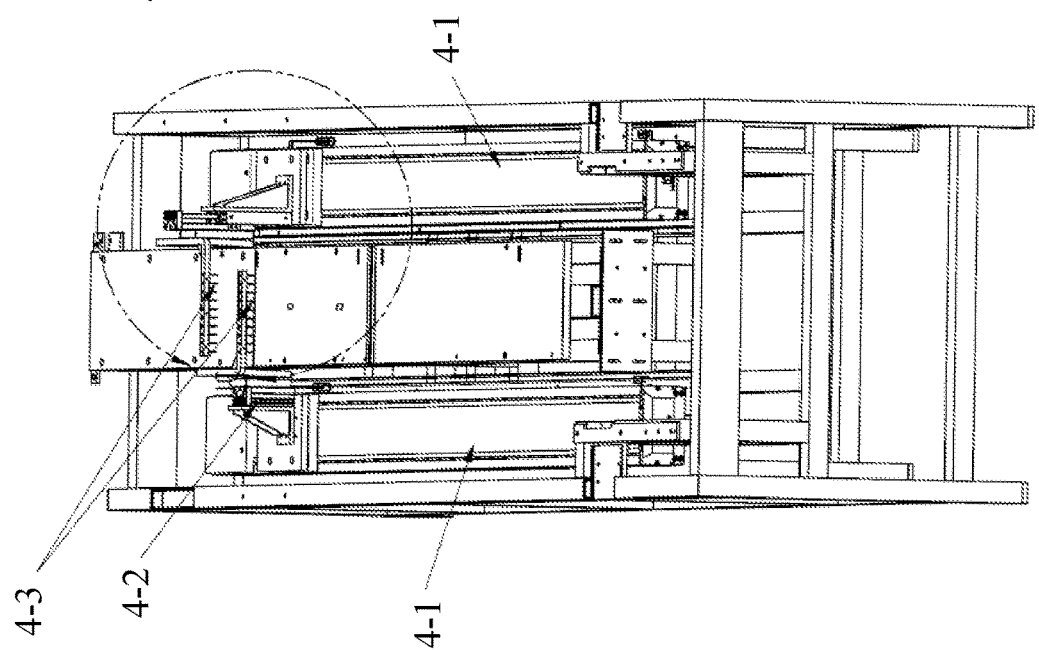

As shown in FIG. 4, the fixed pushing device may be mainly composed of two long slides 4-1, a pushing cylinder 4-2, a needle fixed structure 4-3, and a connection structure 4-4. The device may have two fixed pushing devices, the two fixed pushing devices may operate independently and will not interfere with each other, thereby improving an efficiency of device operation, and increasing production. The long slides may be located on both sides of the conveyor board, the pushing cylinder may be fixed above the slide of the long slides, the needle fixed structure may be located above the conveyor board, which is connected with the pushing cylinder through the connection structure; when the pushing cylinder is downward, the needle fixed structure may be driven down, and the needle fixed structure may be pierced into the squid to fix the squid; at the same time, the long slides drive the pushing cylinder and the needle fixed structure to move forward together, so as to achieve movement of the squid on the conveyor board.

The 3D scanning device consists of a 3D scanner, a scanner holder, and a processing system. The scanner holder spans both sides of the conveyor board, the 3D scanner may be fixed at a central position of a top of the scanner holder, and scanning and imaging of the squid may be completed during a pushing process of the fixed pushing device.

Figure 7:
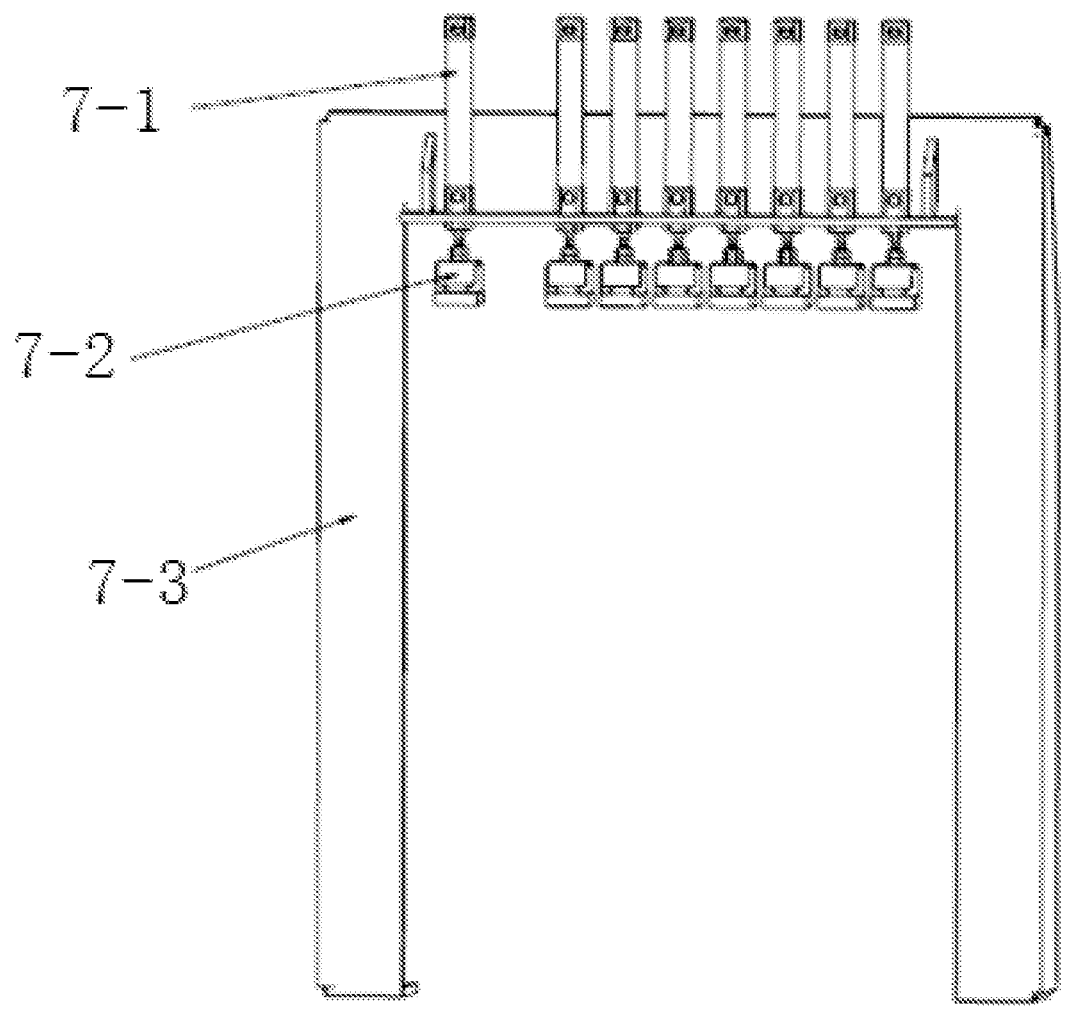
FIG. 7 is a schematic diagram illustrating a clamping device of the intelligent device for cutting squid white slices according to some embodiments of the present disclosure.

As shown in FIG. 7, the clamping device includes a clamping cylinder 7-1, a clamping block 7-2, and a clamping device holder 7-3, the clamping cylinder may be installed on the clamping device holder, the clamping device holder spans two sides of the conveyor board. The clamping device executes operations: after the pushing device finishes pushing for the distance calculated according to Programmable Logic Controller (PLC), the cylinder bar of the thumb cylinder stretches down to drive the clamping block to press on the surface of the squid, and the squid may be fixed on a cutting board through pressure of the cylinder to prevent sliding during cutting.

Figure 8:
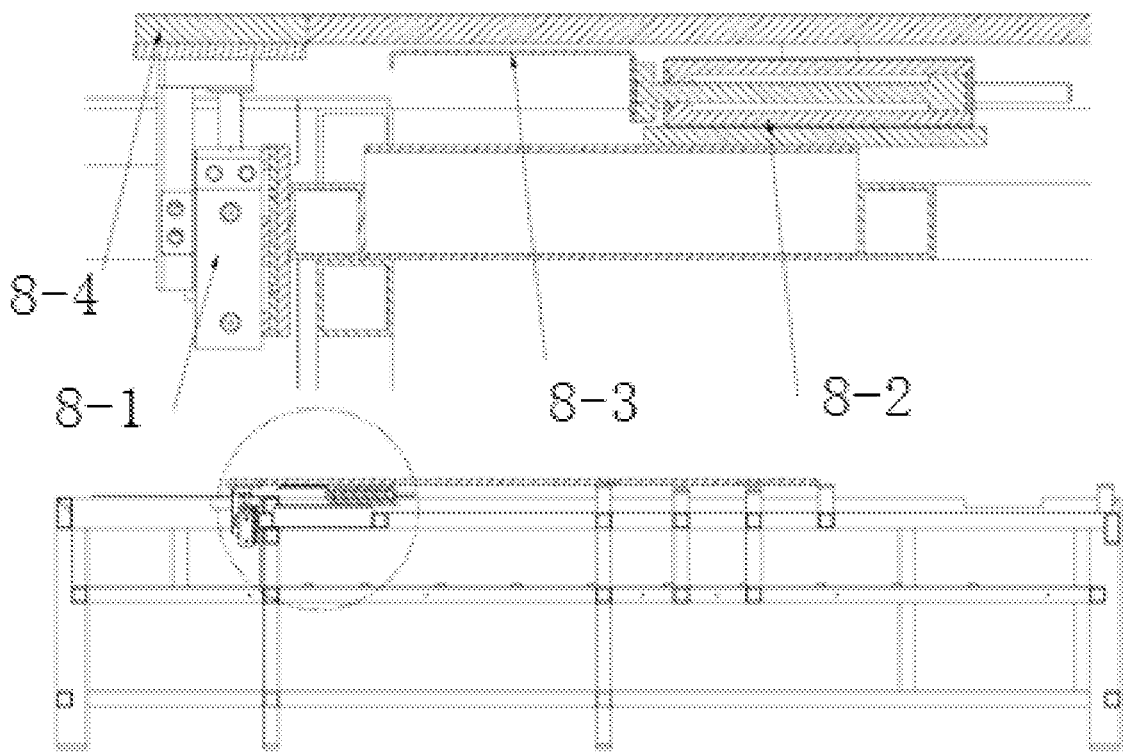
FIG. 8 is a schematic diagram illustrating a discharging device of the intelligent device for cutting squid white slices according to some embodiments of the present disclosure.

As shown in FIG. 8, the discharging device includes a feeding cylinder 8-1, a discharging cylinder 8-2, a discharging board 8-3, and a cutting plate 8-4. The cutting board may be installed on a bar of the feeding cylinder, the discharging cylinder may be located below the conveyor board, whose height is the same as a height when the feeding cylinder retracts. The discharging device executes operations: when the cutting is completed, tailings may be left on the cutting board, the cylinder bar of the feeding cylinder moves down to drive the cutting board downward. When the cutting board reaches the bottom, the discharging cylinder drives the discharging board to stretch outward to push the tailings out of the cutting board and then retracts. After the discharging cylinder retracts, the discharging cylinder drives the cutting board to move upward and return to a original position.

Figure 2:
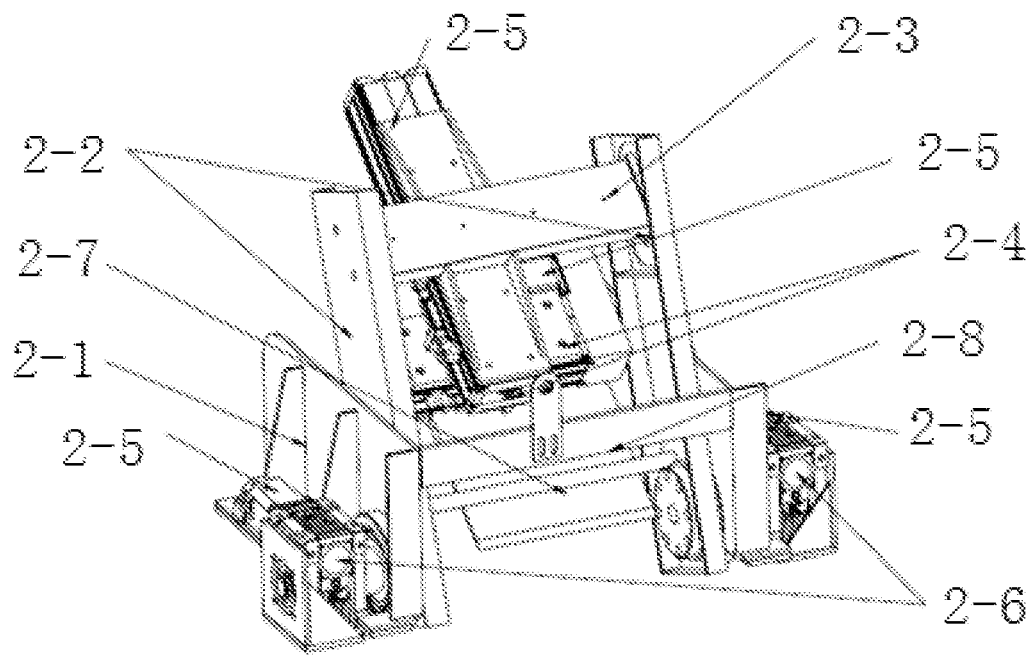
FIG. 2 is a schematic diagram illustrating a cutting rotating device of the intelligent device for cutting squid white slices according to some embodiments of the present disclosure.

As shown in FIG. 2, the cutting rotating device may be mainly composed of a cutting rotating device holder 2-1, a rotating arm 2-2, a cross slide fixed holder 2-3, two straight line slides 2-4, four servo motors 2-5, a reducer 2-6, a blade 2-7, and a blade fixed holder 2-8. The cutting rotating device holder spans both sides of a cutting platform and may be fixed on a base; the rotating arm may be installed on two inner sides of the cutting rotating device holder, which rotates around an axis through a bearing; the cross slide fixed holder may be installed between the two rotating arms, which connects and fixes the two rotating arms; other side of the bearing may be installed with two reducers with the servo motors, which are fixed with the rotating arm using a connection shaft, rotation of the servo motors drives the rotating arm to rotate; the two straight line slides may be installed in a cross, one of which is installed on the slide of the other straight line slide, and the two straight line slides may be installed on the cross slide fixed holder as a whole to achieve horizontal and vertical motion of the slide; and the blade may be fixed on the slide of the below straight line slide through the blade holder, which is used to achieve horizontal and vertical cutting motion with the slide.

The cutting rotating device executes operations: after the pushing device finishes pushing for a distance calculated according to the PLC, the clamping device presses the squid tightly, and a vertical motor drives a lead screw slide to move downward, the blade moves downward with the slide, at the same time, a horizontal motor drives the lead screw slide and the blade to move horizontally. When the blade reaches a bottom end, the blade returns to an origin after a last horizontal movement; after the horizontal slide reaches the origin, the vertical slide drives the blade upward until the blade returns to an upper limit; and when the vertical slide moves upward, the horizontal slide keeps static.

The control system includes electronic components such as various types of sensors, a PLC, a motion control module, an input and output module, and a relay, etc. Each type of sensor may have a limit switch, a position detection sensor, and a proximity switch, etc. The various types of sensors may be distributed between the upper and lower limits of the cylinder, between the front and rear limits of the slide and at the important position in the middle, which is used to detect the positions of squid and slide and protect the slide to prevent collisions, interferences, and other damage to device and dangerous situations. The PLC may be mainly used to receive the signals of each sensor and communicate with an industrial control computer to send a motion instruction to the servo motor and the cylinder, thereby controlling each movement of the device to operate safely and stably. The motion control module may be mainly to read a real-time position of the servo motor and pass it to the PLC to control the motion of the servo motor. The input and output module receives a sensor signal and transmits it to the PLC, and at the same time, the module may output the information processed by the PLC to each actuator.

Figure 9:
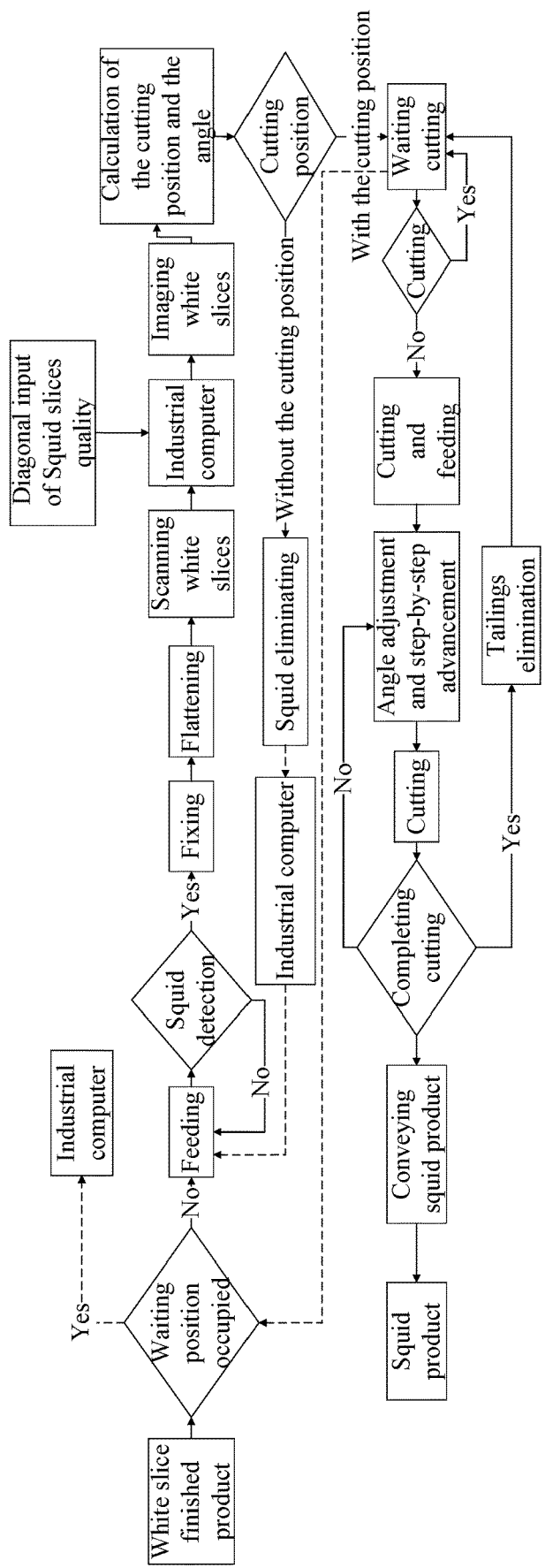
FIG. 9 is a flowchart illustrating an operation process of the intelligent device for cutting squid white slices according to some embodiments of the present disclosure.

As shown in FIG. 1 and FIG. 9, the process of using the above intelligent device for cutting squid into slice with a fixed weight and a fixed diagonal size may include operations.

The squid white slices sorted by thickness and width is put into the material box. First, the PLC may determine whether there is a squid white slice waiting to be cut on a waiting position through the sensor; in response to the determination that there is a squid white slice waiting to be cut on a waiting position, then no material may be sent. Otherwise, the side pushing cylinder may start and push a slice of squid white slice onto the conveying board of the forward pushing cylinder. The side pushing cylinder may retract until an upper limit sensor sends a high potential signal. If the squid detection sensor has not detected the existence of the squid, it may be kept on a low potential, and the side pushing cylinder may repeat the movement. If the squid had not been detected for three times, an alarm signal may be sent to the PLC. When the squid detection sensor and the upper limited sensor of the side pushing cylinder are at high potentials, the forward pushing cylinder may start to send the squid white slices out. When the upper limit sensor of the forward pushing cylinder becomes high potential, the material stop cylinder may stretch out to stop the moving squid white slices in a fixed position, and the forward pushing cylinder may retract.

When the forward pushing cylinder pushes the squid white slices, the dynamic weighing mechanism completes weighing of the squid white slices. After the weighing is completed, a fixing device may fix the squid slices. Then the flattening device may start and flatten the surface of the squid white slices to ensure that the bottom surface of the squid may tightly fit the bottom surface with no empty cavity. At the same time, the upper surface of the squid may be kept flat. When a count of the flattening reaches a preset count, and an original point position sensor is at a high potential, the fixing device may move with the squid white slices to the cutting waiting position, at the same time, information like a count of rotation and a position of the motor may be transmitted to the industrial computer, and the industrial computer may automatically set parameters like a scanning frequency of a scanner, etc. according to the information so that the scanner may perform scanning, and may further automatically determine whether the squid scanning is over according to information on a height of the conveying board and a scanning height change. After the scanning is over, the data may be transmitted to the industrial computer for 3D modeling and volume calculation, and the position sensor of the waiting area becomes the high potential.

A density of the squid white slices may be calculated according to data of a dynamic weighing and a volume of the 3D reconstruction and entered to an industrial computer algorithm. The algorithm determines the cutting position and the cutting angle according to parameters such as the length of a diagonal line and the product weight, and the calculation result may be transmitted to a PLC data cache area for storage.

In some embodiments, the intelligent device for cutting squid white slices may cut based on the optimized cutting point and the optimized cutting angle (or the optimal solution of the cutting point and cutting angle). For example, the optimal solution of the cutting point and cutting angle may be stored in the PLC data cache area as parameters when the intelligent device for cutting squid white slices performs cutting operations to guide a step-by-step advancement and angle adjustment of a conveyor. For the obtaining of the optimal solution method of the cutting point and cutting angle, please refer to the corresponding descriptions of FIGS. 10-15.

When the motor position sensor at the cutting position and the squid detection sensor are both at a low potential, the calculated squid white slices in the waiting area may be transported to the cutting position. At this time, the motor position sensor at the cutting position and the squid detection sensor may turn to a high potential, and the position sensor of the waiting area may become a low potential. When the position sensor of the waiting area becomes a low potential, the feeding device starts and repeats the above process, and the motor not located at the waiting position performs pushing movement. When the dual motors are in the waiting position or the cutting position, the flattening device may perform a flattening and then wait for one of the motors to return to perform the pushing movement and continue the next action aforementioned.

According to the parameters set, the vertical motor of the intelligent device for cutting squid white slices may move downward, and the horizontal motor may reciprocate back and forth. When the vertical motor reaches a set position and the horizontal motor sensor at the origin is at the high potential, the vertical motor may move upward until back to the original position, and the horizontal motor may stop at the same time until the first cutting is completed. When the original point of the vertical motor is a high potential, a conveying device may perform step-by-step advancement and angle adjustment according to the calculated cutting position and the cutting angle by the algorithm. After the adjustment, the signal may be sent to the PLC. At the same time, the PLC may control the cutting rotating device to repeat the cutting movement and record a count of cut. When the count of cut is equal to the calculated count of cut, the cutting completes and the discharging device starts. The cylinder bar of the feeding cylinder moves down to drive the cutting board downward. When the cutting board reaches the bottom and the lower limit sensor of the feeding cylinder turns to a high potential, the discharging cylinder drives the discharging board to stretch outward until the lower limit sensor of the discharging cylinder turns to a high potential to push the tailings out of the cutting board and then retract. When the upper limit sensor of the discharging cylinder turns to the high potential and after the discharging cylinder retracts, the discharging cylinder drives the cutting board to move upward and return to the original position. When the discharging is completed, the upper limit of the feeding cylinder turns to high potential. The squid at the waiting position repeats the above pushing, cutting, and discharging process. While discharging, a fixed pushing device after cutting completed may move to the original point. To prevent the pushing cylinder from interfering with the clamping device when it moves upwards, the pushing cylinder may move upwards after the fixed pushing device moves for a distance, and the upper limit sensor turns high potential. At the same time, the position sensor and the squid detection sensor at the cutting position turn low potential, and the squid at the waiting position may be pushed and cut. Throughout the process of pushing and cutting, the industrial computer, the PLC, and the servo motor may interact position information in real time and control each performing device according to the settings. In this way, the device may carry out feeding, and the two fixed pushing devices may carry out cyclic reciprocating pushing and cutting.

Figure 10:
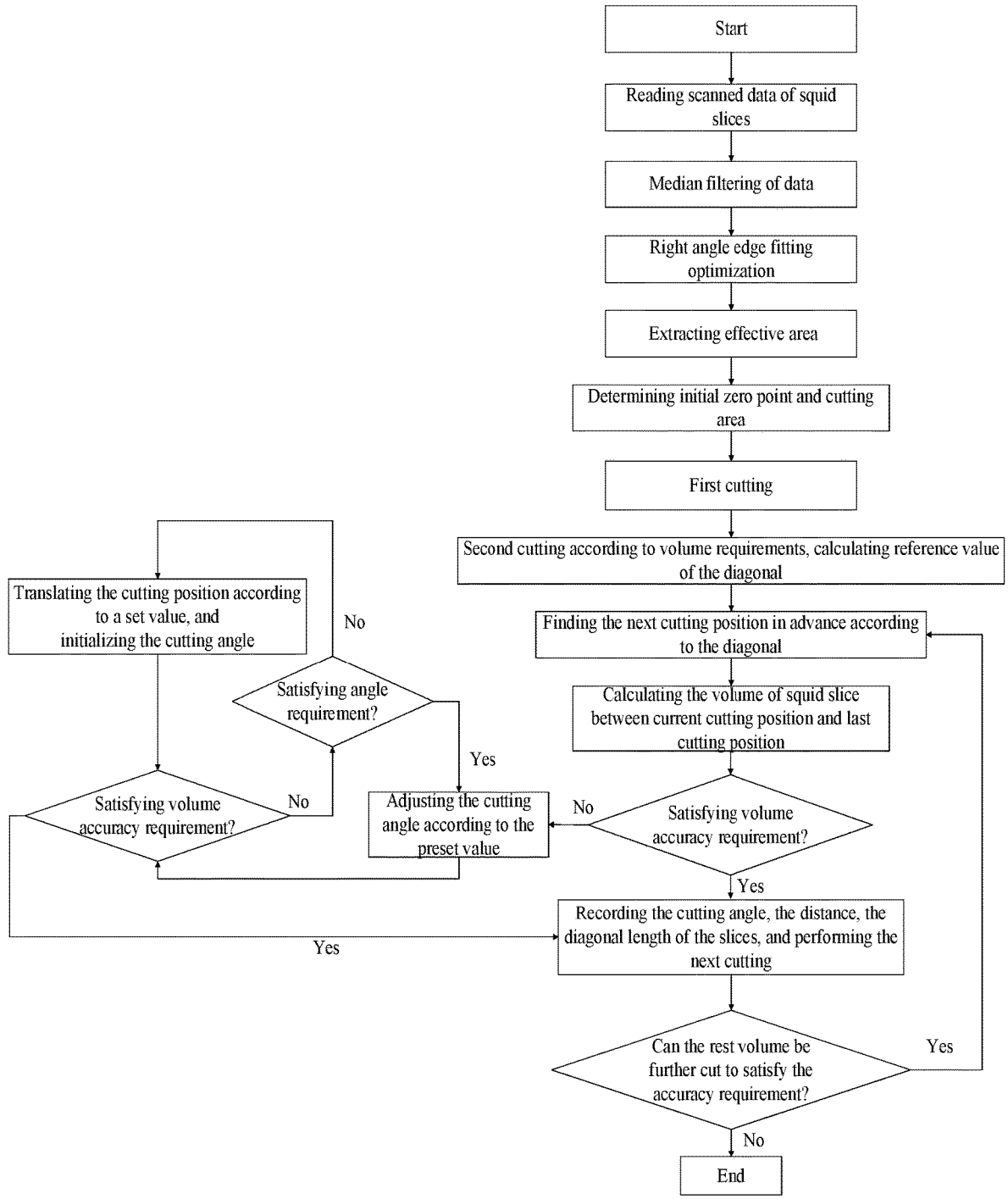
FIG. 10 is a flowchart illustrating the intelligent method for cutting squid white slices according to some embodiments of the present disclosure.

As shown in FIG. 10, the main flows of the intelligent method for cutting squid white slices with the fixed weight and fixed diagonal size according to the embodiments may include: reading the scanned data, optimizing the data, extracting the effective area of the squid white slices, determining the cutting zero point, determining the processing area, determining optimization of the cutting point position and the cutting angle, etc.

The reading the scanned data refers to reading a laser point cloud data of a three-dimensional (3D) topography of the squid white slices.

The optimizing the data include: first suppressing noise of the laser point cloud data through a filtering algorithm, and determining a suitable window size to reduce the effect of the filtering algorithm on the data itself; then performing a right-angle edge optimization according to a sensor viewing angle projection and combining an edge feature of the squid white slices to restore actual data of edges of the squid white slices. The filter algorithm adopts a median filter, and a filter window may be 9*5.

Figure 12:
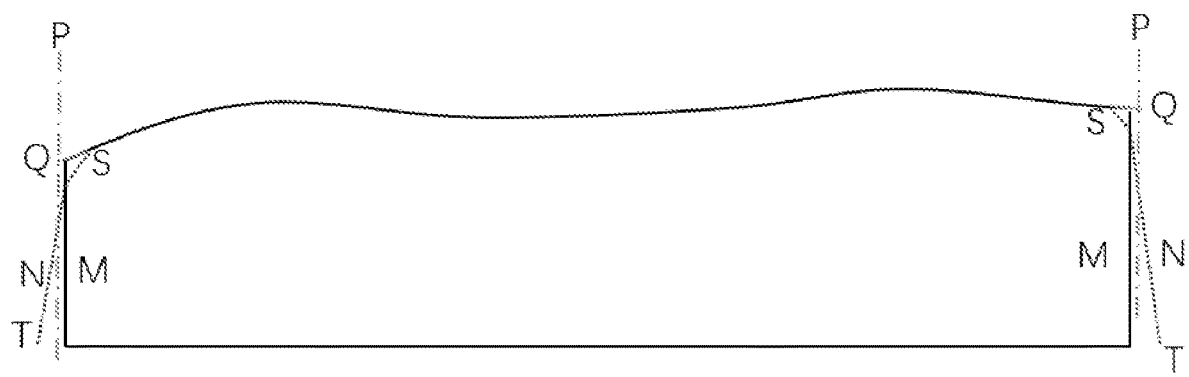
FIG. 12 is a schematic diagram illustrating a comparison between a scanned point cloud data of a cross-section of the squid white slices and a real height the squid white slices according to some embodiments of the present disclosure.

The right-angle edge optimization algorithm flow may be: based on a feature of straight on both sides of white slices after taking the squid as shown in a solid line M in FIG. 12, for the phenomenon of the scanned data of squid white slices being smoothed at the edge of the slices shown in a dotted line N in FIG. 12, a changing gradient of the scanned edge data may be calculated, and a sensor detection edge coordination T and a smooth end coordination S of the squid white slice may be determined through a threshold method to obtain a smooth area width. The smooth end coordination S outward 40% of the smooth area width may be taken as an edge estimated coordination P of the scanned data, and the data of 20 coordinates inside the smooth end coordination S may be taken to construct a height fitting model of the squid edge to estimate a height coordinate at the edge P. The height fitting model may adopt a least squares polynomial fitting algorithm.

The extracting the effective area of the squid white slices may include obtaining row and column coordinates where edges of the squid white slices locate through traversing row and column vectors; and cropping the laser point cloud data with the row and column coordinates to reduce a scale of a matrix and remove a large amount of invalid row and column data.

Figure 11:
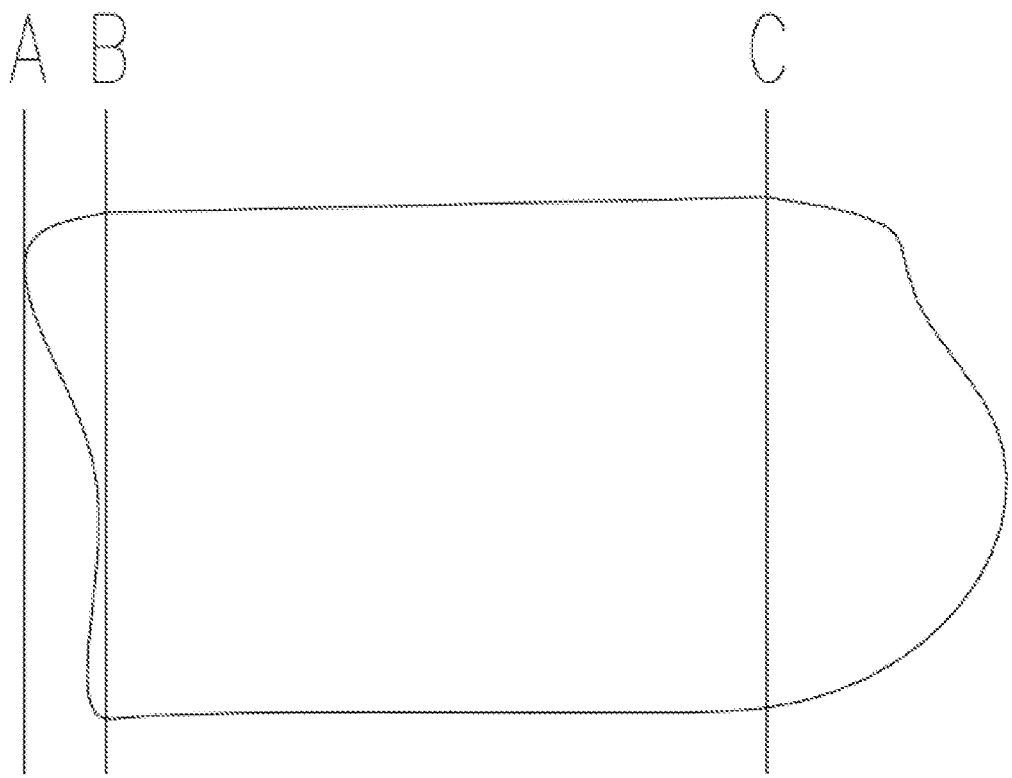
FIG. 11 is a schematic diagram illustrating a zero point of the squid white slices and a cutting process area according to some embodiments of the present disclosure.

The determining the cutting zero point may take a forefront of the detectable squid white slice as a zero point coordinate, that is, the line A coordinate in FIG. 11, which is taken as a common zero point coordinate of the intelligent device for cutting the squid white slices and an image processing system.

The common zero point coordinate may be a horizontal starting point position of a point cloud image of the squid. The horizontal starting point position may be obtained on a mechanism structure (the intelligent device for cutting the squid white slices) through an opposed sensor detecting. The mechanism structure may take the coordinate as the zero point to push a head of the squid white slices to a cutting position for cutting.

The determining the processing area includes finding the cutting process area based on an edge missing rate boundary condition (e.g., no greater than 20%) of a qualified squid block product, i.e., the area between lines B and C. The position of 2.5 mm behind the concave tangent of the head of the squid white slices may be taken as the position of the first cut, i.e., line B. Once the valid width from the tail to the head is greater than 80% of the maximum width, it may be considered to reach the flat part, i.e., line C.

The head may be position where the squid white slices start to be processed, such as line A shown in FIG. 11, the tail may be position of the end of the squid white slices, such as the right side of line C shown in FIG. 11.

The determining optimization of the cutting point position and the cutting angle may include following operations.

(a) The cutting point position of the first cut being on line B, and the cutting angle $\alpha$ being set according to the user's needs.

(b) Traversing backward at the cutting angle $\alpha$ to find a cutting point position d1 of a second cut according to the quality requirements of the squid block products (assuming that the density of the squid is the same, it may be equivalent to the volume requirements), calculating an intersection p1 of the second cut and an upper surface, and calculating a reference value L of a diagonal length of a cut squid block using Pythagorean Theorem based on the intersection of the first cut and an lower surface and the intersection of the second cut and an upper surface.

Figure 13:
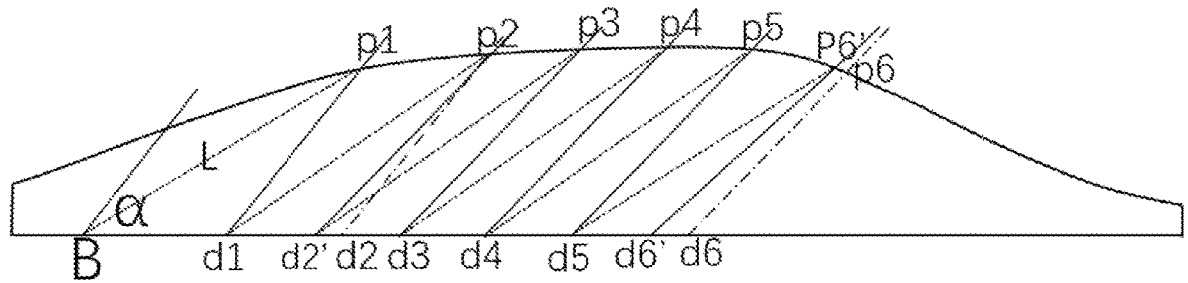
FIG. 13 is schematic diagram illustrating a calculation of the cutting position and the angle of squid white slices according to some embodiments of the present disclosure.

(c) When calculating a cutting point position of a third cut, first obtaining a cutting position p2 from an upper surface of the squid and a cutting point position d2 from a lower surface of the squid according to the reference value L of the diagonal length; then determining whether a slice volume between a current cutting position and a previous cutting position satisfies a quality requirement (a deviation of ±0.5 g being allowed); in response to a determination that the slice volume between the current cutting position and the previous cutting position satisfies the quality requirement, performing cutting directly; in response to a determination that the slice volume between the current cutting position and the previous cutting position does not satisfy the quality requirement, increasing or decreasing the cutting angle by 1°, as shown in FIG. 13, the d2 may be adjusted to d2'. After an adjustment on the angle, if the quality requirement is still unsatisfied, the cutting angle may be continued to adjust. After several adjustments on the angle, the cutting angle may be restored to a and the cutting position may be translated for 0.5 mm according to a quality difference, thereby sacrificing a diagonal length accuracy. As shown in FIG. 13, when calculating the position of the sixth cut, the cutting angle is adjusted from d6 to d6' and p6 to p6'. If the quality is not satisfied, an iterative loop may be performed according to the way of adjusting angle and translating cutting position until the cutting point position and the cutting angle of the third cut are found.

(d) Calculating a cutting point position and a cutting angle of a rest cutting process area according to a same method as calculating the cutting point position and the cutting angle of the third cut.

(e) Finally, sending a calculated optimal solution of the cutting point position and the cutting angle of the squid white slices to a control system for cutting until an end of the process.

The cutting angle refers to the angle between the cutting tool and the bottom surface of the squid, such as the angle α at point B in FIG. 13.

In some embodiments, the calculating device may further use a preset algorithm to perform iterative calculation to iteratively update the multiple groups of candidate solutions for cutting squid white slices until preset conditions are satisfied, and the candidate solution for cutting the squid white slices that satisfy the preset conditions may be selected as a target solution for cutting the squid white slices. In some embodiments, the preset conditions may include the optimal solution of the cutting point and the cutting angle of the squid white slices. In some embodiments, the optimal solution of the cutting point and the cutting angle of the squid white slices may be taken as the parameters of the intelligent device for cutting squid white slices when performing cutting operations. Relevant descriptions of the intelligent device for cutting squid white slices performing cutting operations based on the optimal solution of the cutting point and the cutting angle of the squid white slices may be referred to corresponding descriptions of FIG. 1 and FIG. 9.

In the first iteration of the iterative updates, an update may be performed on an initial candidate solution for cutting the squid white slices based on an initial multidimensional increment to obtain an updated candidate solution for cutting the squid white slices. The updated candidate solution for cutting the squid white slices may be determined as a candidate solution for cutting the squid white slices to be processed, and the initial multidimensional increment may be determined as the multidimensional increment to be processed in the next round. The initial multidimensional increment may be a system default value, an experience value, a human preset value, etc., or any combination thereof according to the actual needs.

The initial candidate solution for cutting the squid white slices may be determined through an initialization vector. An exemplary flow of the initialization vector may be as follows: for a squid white slice, assuming that there is no more than cut points and cutting angles to be determined, the value of A may be determined by calculating the total weight of the squid white slices and the preset standard weight of cut squid blocks, and A may be the minimum positive integer which is greater than the value. The count of initial candidate solutions for cutting the squid white slices may be set to N, then the dimension of each initial candidate solution for cutting the squid white slices may be A, each dimension corresponds to a group of cutting point position and cutting angle, A and N may both be positive integers. The cutting point position may only be appropriately changed when the cutting angle cannot be satisfied by changing the cutting angle several times.

The vector $X_i^0$ corresponding to the $i^{th}$ initial candidate solution for cutting the squid white slices may be expressed as:

$$(X_{i1}, X_{i2}, \ldots, X_{iA}^0)$$

where $X_{im}^0 = (a_{im}, b_{im})$; $a_{im}$ and $b_{im}$, respectively denote the $m^{th}$ group of cutting point and cutting angle of the $i^{th}$ candidate solution for cutting the squid white slices.

The vector $(X_{i1}^0, X_{i2}^0, \ldots, X_{iA}^0)$ corresponding to the N initial candidate solutions for cutting the squid white slices may be represented as:

$$((X_{11}^0, X_{12}^0, \ldots, X_{1A}^0), (X_{21}^0, X_{22}^0, \ldots, X_{2A}^0), (X_{N1}^0, X_{N2}^0, \ldots, X_{NA}^0))$$

where 0 denotes an identifier, which represents the 0th round of iteration, that is, the initial value that has not yet iterated; i denotes a serial number of the candidate solution for cutting the squid white slices, i≤N.

In each round of subsequent iterations, the multidimensional increment to be processed of the round may be updated to obtain the updated multidimensional increment. The candidate solution for cutting the squid white slices to be processed may be updated based on the updated multidimensional increment to obtain the updated candidate solution for cutting the squid white slices. The updated candidate solution for cutting the squid white slices may be determined as a candidate solution for cutting the squid white slices to be processed, and the initial multidimensional increment may be determined as the multidimensional increment to be processed in the next round.

In some embodiments, updating multidimensional increment to be processed may be achieved through updating an incremental element to be processed. The incremental element may be the element of each dimension of the multidimensional increment, and the multidimensional increment may contain a plurality of incremental elements. There may be a corresponding relationship between each incremental element and each group of cutting angle in the candidate solution for cutting the squid white slices to be processed. The incremental element may be used to indicate the adjustment range of the corresponding cutting angle.

The updating the incremental element to be processed may be implemented based on a current loss of the previous round, and the updated incremental element may be taken as the incremental element to be undated in the next round. The current loss of the previous round may be determined based on the differences of cutting results between the candidate cutting point and angle obtained from the previous round and the optimal candidate cutting point and angle in the history.

Exemplarily, after the (k+1)th round of iteration, the updated incremental element may be calculated through the following formula (1):

$$v_{ia}^{k+1} = \omega v_{ia}^k + c_1 r_1 (p_{ia,pbest}^k - X_{ia}^{k+1}) + c_2 r_2 (p_{a,gbest}^k - X_{ia}^k) \quad (1)$$

where i denotes the serial number of the candidate solution for cutting the squid white slices, i≤N; a denotes the serial number of a group of cutting point position and cutting angle, a≤A; k denotes a count of iteration round, k≥0, $v_{ia}^k$ denotes the incremental element to be processed obtained after iteration of the $k^{th}$ round based on the $a^{th}$ group of cutting point position and cutting angle of the $i^{th}$ candidate solution for cutting the squid white slices. $X_{ia}^k$ denotes the $a^{th}$ group of cutting point position and cutting angle of the $i^{th}$ candidate solution for cutting the squid white slices obtained after the $k^{th}$ round of iteration. ω denotes an inertia weight constant. $c_1$ denotes an individual learning factor and $c_2$ denotes a group learning factor. $r_1$ and $r_2$ denote any value within the interval [0, 1], which is used to increase the randomness of search. $p_{ia,pbest}^k$ denotes the count of the $a^{th}$ group of cutting point position and cutting angle corresponding to the optimal solution determined during the iterations of the $i^{th}$ candidate solution for cutting the squid white slices after the $k^{th}$ iteration. At this time, the optimal solution may refer to after the $k^{th}$ round of iteration, when the cutting result of a candidate solution for cutting the squid white slices is the optimal value of the plurality of cutting results corresponding to the previous iterations, a set of each group of cutting point position and cutting angle corresponding to the candidate solution for cutting the squid white slices (i.e., the optimal solution in individual history). $p_{a,gbest}^k$ denotes the values of the $a^{th}$ group of cutting point position and cutting angle corresponding to the optimal solution determined during the iterations of all N candidate solutions for cutting the squid white slices after the $k^{th}$ iteration. At this time, the optimal solution may refer to after the $k^{th}$ round of iteration, among the above plurality of candidate solutions for cutting the squid white slices with the optimal cutting results in the iterations, the values of each group of cutting point position and cutting angle corresponding to the candidate solutions for cutting the squid white slices with the optimal cutting result (i.e., the optimal solution in group history).

The inertia weight constant, the individual learning factor, the group learning factor, and a random constant may be the system default value, the experience value, the human preset value, etc., or any combination thereof according to the actual needs.

The maximum absolute value of the incremental element in each round of iteration may be $v_{max}$, which indicates the maximum adjustment range of each group of cutting angle. In the (k+1)th round of iteration, the multidimensional increment constructed by the adjustment range of each group of cutting angles may be expressed as $(v_{i1}, v_{i2}, \ldots, v_{iA})$. The multidimensional increment corresponding to N candidate solutions for cutting the squid white slices may be expressed as $v_{11}, v_{12}, \ldots, v_{1A}), (v_{21}, v_{22}, \ldots, v_{2A}), \ldots,$ $(v_{N1}, v_{N2}, \ldots, v_{NA}))$. The value of any incremental element in the vector may be negative, but the absolute value of the incremental element may not greater than $v_{max}$.

In some embodiments, each candidate solution for cutting the squid white slices may be updated based on the incremental element of updated multidimensional increment. Exemplarily, after the (k+1)th round of iteration, the updated candidate solution for cutting the squid white slices may be calculated through the following formula (2):

$$X_{ia}^{k+1} = X_{ia}^k + v_{ia}^{k+1} \quad (2)$$

For example, after the first iteration, the updated $i^{th}$ candidate solution for cutting the squid white slices may be calculated through the following formula (3):

$$X_i^1 = (X_{i1}^1, X_{i2}^1, \ldots, X_{iA}^1) = (X_{i1}^0 + v_{i1}^1, X_{i2}^0 + v_{i2}^1, \ldots, X_{iA}^0 + v_{iA}^1) \quad (3)$$

The corresponding vector expression form of the N updated candidate solutions for cutting the squid white slices may be calculated through the following formula (4):

$$(X_1^1, X_2^1, \ldots, X_N^1) = ((X_{11}^1, X_{12}^1, \ldots, X_{1A}^1), (X_{21}^1, X_{22}^1, \ldots, X_{2A}^1), \ldots, (X_{N1}^1, X_{N2}^1, \ldots, X_{NA}^1)) = (X_{11}^0 + v_{11}^1, X_{12}^0 + v_{12}^1, \ldots, X_{1A}^0 + v_{1A}^1), (X_{21}^0 + v_{21}^1, X_{22}^0 + v_{22}^1, \ldots, X_{2A}^0 + v_{2A}^1), \ldots, (X_{N1}^0 + v_{N1}^1, X_{N2}^0 + v_{N2}^1, \ldots, X_{NA}^0 + v_{NA}^1)) \quad (4)$$

In some embodiments, in each round of iteration update, all cut point positions and cutting angles may have a constraint 1: the cutting point may be located within the length of the squid white slices and the cutting angle may be limited to the angle range of the blade rotation.

In some embodiments, in each round of iteration update, all cutting point positions and cutting angles may have a constraint 2: the length and width value of the squid slices between any two cuts may be within a certain range, and the range value may be preset.

In some embodiments, in each round of iteration update, all cutting point positions and cutting angles may have a constraint 3: the volume of the squid slices between any two cuts may be within a certain range (i.e., the weight being within a certain range) and the range may be preset.

In some embodiments, in case after a certain iteration, at least one group of candidate cutting point and candidate cutting angle of at least one candidate solution for cutting the squid white slices does not satisfy the constraint 1, then the cutting point position and the cutting angle may be initialized.

In some embodiments, in case after a certain iteration, at least one group of cutting angle of at least one candidate solution for cutting the squid white slices does not satisfy at least one of the constraint 2 and the constraint 3 after B times of continuous iterations, then based on the differences of length, width, or volume between the actual size and the standard value, the translation direction and distance of the cutting point may be determined, and the cutting angle may be initialized. B may be the system default value, the experience value, the human preset value, etc., or any combination thereof according to the actual needs.

In some embodiments, the above preset algorithm may be used to continuously iterate the candidate solution for cutting the squid white slices until it meets preset conditions and the iterative update may be over. The preset conditions may be that the actual maximum cutting count of at least one group of candidate solution for cutting the squid white slices reaches a preset value, and a scoring value determined based on the difference between the preset theoretical optimal cutting result and the cutting result may be greater than a threshold.

In some embodiments, the scoring value corresponding to the difference between the preset theoretical optimal cutting result and the cutting result of the candidate solution for cutting the squid white slices may be determined using modeling or adopting various data analysis algorithms, such as regression analysis, discriminant analysis, etc. For example, different weights may be given to the length, width, and volume of the squid slices between two cuts, and based on its difference with the optimal length, width and volume of the preset theoretical optimal cutting result, the score may be determined through a weighted fusion method.

After the end of iterative update, the updated multiple candidate solutions for cutting the squid white slices may converge into a target solution for cutting the squid white slices. The target solution for cutting the squid white slices may include a plurality of groups of cutting point positions and cutting angles. At this time, the cutting result of the target solution for cutting the squid white slices should be the optimal value in the cutting results corresponding to a plurality of candidate solutions for cutting the squid white slices of the previous iterations.

Some embodiments of the present disclosure may continue to update the plurality of candidate solutions for cutting the squid white slices through iteration, so as to determine the target solution for cutting the squid white slices with the optimal cutting result and to improve the cutting efficiency, reduce the amount of cutting waste material, and save processing costs.

Figure 14:
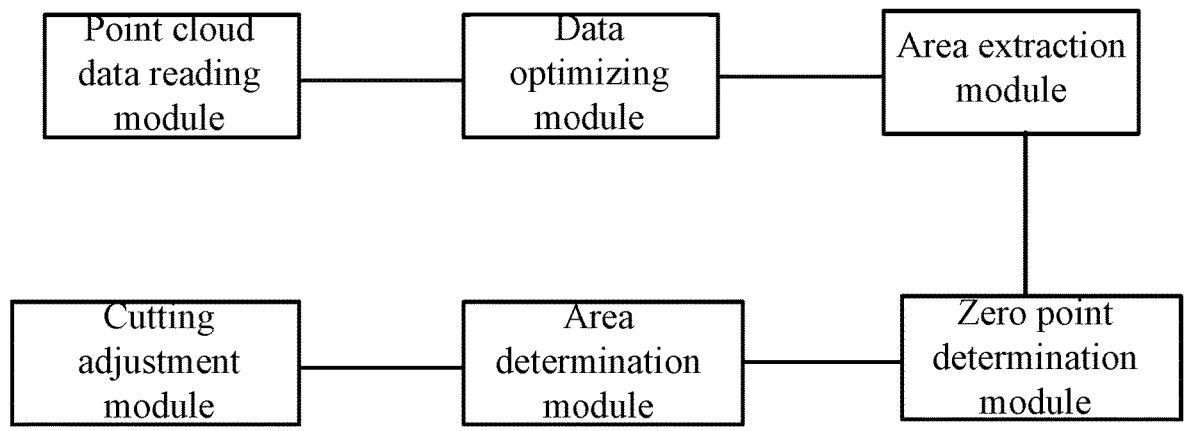
FIG. 14 is a module diagram illustrating an intelligent system for cutting squid white slices according to some embodiments of the present disclosure.

FIG. 14 is a module diagram illustrating an intelligent system for cutting squid white slices according to some embodiments of the present disclosure, the device may include a point cloud data reading module, a data optimizing module, an area extraction module, a zero point determination module, an area determination module, and a cutting adjustment module. The point cloud data reading module configured to read laser point cloud data of a 3D topography of the squid white slices; the data optimizing module configured to optimize the laser point cloud data; the area extraction module configured to extract an effective area of the squid white slices; the zero point determination module configured to determine a cutting zero point; the area determination module configured to determine a cutting process area; and the cutting adjustment module configured to determine a cutting point position and optimize a cutting angle.

Figure 15:
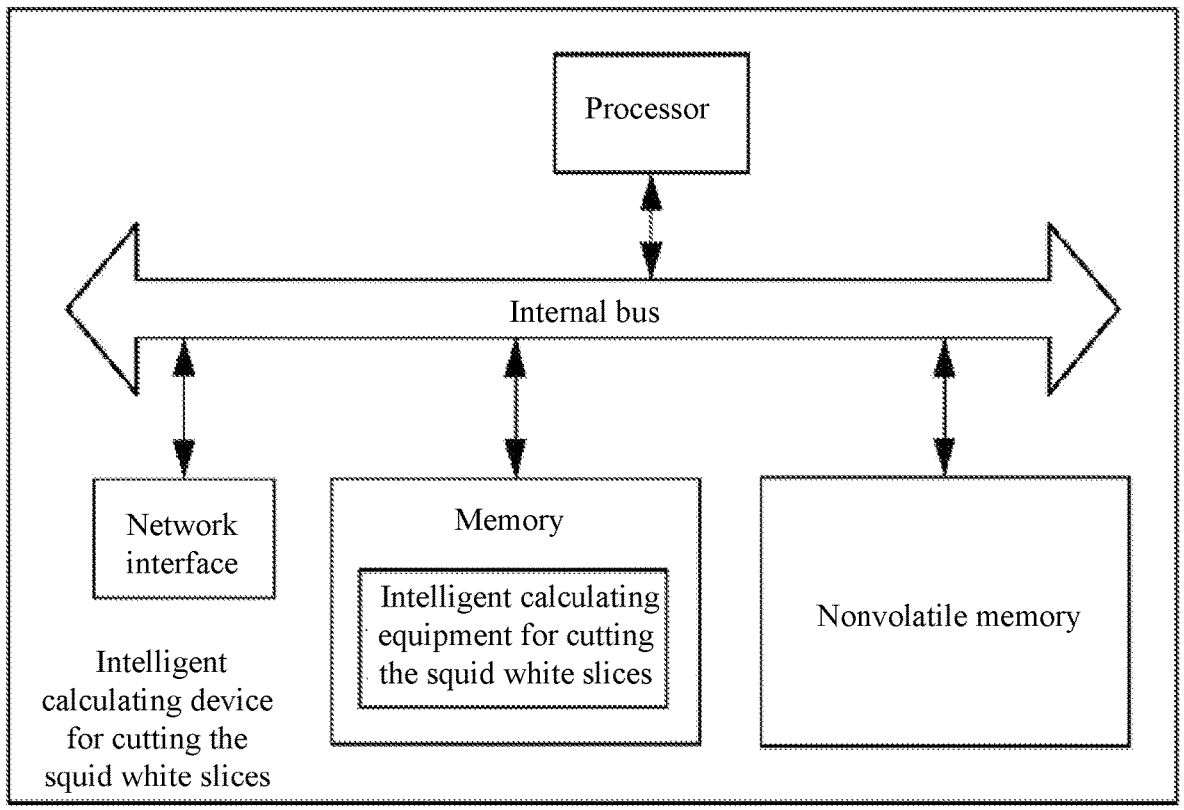
FIG. 15 is a structure diagram illustrating a hardware of the intelligent device for cutting squid white slices according to some embodiments of the present disclosure.

The embodiments of the calculation system of some embodiments of the present disclosure may be applied on a network device. The device embodiment may be implemented by software, or it may further be implemented through the hardware or a combination of the software and the hardware. For example, when the embodiment is implemented by software, as a logical device, it may be formed by reading the corresponding computer program instructions in the non-volatile memory into the memory through the processor of the device, and the computer program may be used to perform the intelligent method for cutting the squid white slices. From the perspective of hardware, as shown in FIG. 15, FIG. 15 is a structure diagram illustrating a hardware of the intelligent device for cutting squid white slices according to some other embodiments of the present disclosure, except for a processor, a network interface, a memory, and a non-volatile memory shown in FIG. 15, the device may further include other hardware, so that expansions may be performed on the hardware level. On the other hand, the present disclosure further provides a non-transitory computer-readable storage medium storing a computer program. The computer program may be used to perform the intelligent method for cutting squid white slices.

For the embodiments of the calculating device, which are basically corresponding to the method embodiments, the relevant parts may refer to the part of the descriptions of the method embodiments. The embodiments described above are only for the purpose of illustration, and those skilled in the art may understand and implement the embodiments without making creative labors.

It should be understood that the terms "system", "device", "unit" and/or "module" used in the specification are means used to distinguish different components, elements, parts, segments, or assemblies. However, these words may be replaced by other expressions if they serve the same purpose.

The terminology used herein is for the purpose of illustration only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added into the flowcharts. One or more operations may be removed from the flowcharts.

The basic concept has been described above. Obviously, for the those skilled in the art, the above detailed disclosure is only used as an example, and it does not constitute a limitation of the present disclosure. Although it is not clearly stated here, those skilled in the art may make modifications, improvements, and amendments to the present disclosure. The modifications, improvements, and amendments are proposed in the present disclosure, so the modifications, improvements, and amendments of this type still belong to the spirit and scope of the embodiments of the present disclosure.

At the same time, the present disclosure uses a specific word to describe the embodiments of the present disclosure. For example, "one embodiment", "one implementation example", and/or "some embodiments" means a feature, structure or features related to at least one embodiment related to the present disclosure. Therefore, it should be emphasized and noticed that in the present disclosure, "one implementation example" or "one embodiment" or "an alternative embodiment" that are mentioned in different positions in the present disclosure does not necessarily mean the same embodiment. In addition, some features, structures, or characteristics of one or more embodiments in the present disclosure may be properly combined.

Furthermore, the recited order of processing elements or sequences, or the use of numbers, letters, or other designations therefore are not intended to limit the claimed processes and methods to any order except expressly stated in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

Finally, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A calculation method for intelligent cutting squid white slices, the calculation method being implemented on a calculation device; the calculation device having at least one processor and at least one storage medium including an instruction set used for intelligent cutting the squid white slices, the calculation method comprising:
   reading a laser point cloud data of a three-dimensional (3D) topography of the squid white slices;
   optimizing the laser point cloud data;
   extracting an effective area of the squid white slices;
   determining a cutting zero point;
   determining a cutting process area; and
   determining optimization of a cutting point position and a cutting angle; wherein the determining optimization of a cutting point position and a cutting angle comprises:
   (a) setting a cutting point position of a first cut at an edge of the cutting process area, and setting a cutting angle as a at the same time;
   (b) traversing backward at the cutting angle α to find a cutting point position d1 of a second cut according to quality requirements of squid block products, calculating an intersection p1 of the second cut and an upper surface, and calculating a reference value L of a diagonal length of a cut squid block;
   (c) when calculating a cutting point position of a third cut, first obtaining, according to the reference value L of the diagonal length, a cutting position p2 from an upper surface of the squid and a cutting point position d2 from a lower surface of the squid; then determining whether a slice volume between a current cutting position and a previous cutting position satisfies a quality requirement; in response to a determination that the slice volume between the current cutting position and the previous cutting position satisfies the quality requirement, performing cutting directly; in response to a determination that the slice volume between the current cutting position and the previous cutting position does not satisfy the quality requirement, adjusting the cutting angle α; after several adjustments, the quality requirement being still unsatisfied, restoring the cutting angle to α, and translating the cutting position according to a quality difference;
   (d) calculating, according to a same method as calculating the cutting point position and the cutting angle of the third cut, a cutting point position and a cutting angle of a rest cutting process area; and
   (e) sending a calculated optimal solution of the cutting point position and the cutting angle of the squid white slices to a control system for cutting until an end of the process.

2. The calculation method for intelligent cutting the squid white slices of claim 1, wherein the optimizing a laser point cloud data comprises:
   suppressing noise of the laser point cloud data through a filtering algorithm; and
   performing a right-angle edge optimization according to a sensor viewing angle projection and combining an edge feature of the squid white slices to restore actual data of edges of the squid white slices.

3. The calculation method for intelligent cutting the squid white slices of claim 2, wherein the filter algorithm adopts a median filter, and a filter window is 9*5.

4. The calculation method for intelligent cutting the squid white slices of claim 1, wherein the extracting an effective area of the squid white slices comprises:
   obtaining row and column coordinates where edges of the squid white slices locates through traversing row and column vectors; and cropping the laser point cloud data with the row and column coordinates to reduce a scale of a matrix and remove a large amount of invalid row and column data.

5. The calculation method for intelligent cutting the squid white slices of claim 1, wherein the determining a cutting zero point comprises:
taking a forefront of detectable squid white slices as a zero point coordinate, which is taken as a common zero point coordinate of an intelligent device for cutting the squid white slices and an image processing system.

6. The calculation method for intelligent cutting the squid white slices of claim 5, wherein the common zero point coordinate is a horizontal starting point position of a point cloud image of the squid, the horizontal starting point position is obtained on the intelligent device for cutting the squid white slices through an opposed sensor detecting; the intelligent device for cutting the squid white slices takes the coordinate as the zero point to push a head of the squid white slices to a cutting position for cutting.

7. The calculation method for intelligent cutting the squid white slices of claim 1, wherein the determining a cutting process area comprises: finding, based on an edge missing rate boundary condition of a qualified squid block product, the cutting process area.

8. A calculation device for intelligent cutting squid white slices, comprising:
a point cloud data reading module configured to read laser point cloud data of a 3D topography of the squid white slices;
a data optimizing module, configured to optimize the laser point cloud data;
an area extraction module, configured to extract an effective area of the squid white slices;
a zero point determination module, configured to determine a cutting zero point;
an area determination module, configured to determine a cutting process area; and
a cutting adjustment module, configured to determine optimization of a cutting point position and a cutting angle, wherein to determine optimization of a cutting point position and a cutting angle, the cutting adjustment module is further configured to:

(a) set a cutting point position of a first cut at an edge of the cutting process area, and set a cutting angle as a at the same time;
(b) traverse backward at the cutting angle $\alpha$ to find a cutting point position d1 of a second cut according to quality requirements of squid block products, calculate an intersection p1 of the second cut and an upper surface, and calculate a reference value L of a diagonal length of a cut squid block;
(c) when calculating a cutting point position of a third cut, first obtain, according to the reference value L of the diagonal length, a cutting position p2 from an upper surface of the squid and a cutting point position d2 from a lower surface of the squid; then determine whether a slice volume between a current cutting position and a previous cutting position satisfies a quality requirement; in response to a determination that the slice volume between the current cutting position and the previous cutting position satisfies the quality requirement, perform cutting directly; in response to a determination that the slice volume between the current cutting position and the previous cutting position does not satisfy the quality requirement, adjust the cutting angle $\alpha$; after several adjustments, the quality requirement being still unsatisfied, restore the cutting angle to $\alpha$, and translate the cutting position according to a quality difference;
(d) calculate, according to a same method as calculating the cutting point position and the cutting angle of the third cut, a cutting point position and a cutting angle of a rest cutting process area; and
(e) send a calculated optimal solution of the cutting point position and the cutting angle of the squid white slices to a control system for cutting until an end of the process.

9. A non-transitory computer-readable storage medium storing computer instructions, wherein when reading the computer instructions in the storage medium, a computer implements the intelligent method for cutting the squid white slices of claim 1.

* * * * *